(12) United States Patent
Allison et al.

(10) Patent No.: US 8,887,263 B2
(45) Date of Patent: *Nov. 11, 2014

(54) AUTHENTICATION SHARING IN A FIREWALL CLUSTER

(75) Inventors: Tylor Allison, Stillwater, MN (US); Anish Thomas, Karnataka (IN); Andrew Nissen, Roseville, MN (US); Michael James Silbersack, Little Canada, MN (US)

(73) Assignee: McAfee, Inc., Santa Clara, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 13/227,848

(22) Filed: Sep. 8, 2011

(65) Prior Publication Data

US 2013/0067557 A1 Mar. 14, 2013

(51) Int. Cl.
*G06F 9/00* (2006.01)
*H04L 12/24* (2006.01)
*H04L 29/06* (2006.01)
*H04L 29/08* (2006.01)

(52) U.S. Cl.
CPC ............ *H04L 41/12* (2013.01); *H04L 63/0218* (2013.01); *H04L 63/0209* (2013.01); *H04L 67/10* (2013.01); *H04L 67/1036* (2013.01); *H04L 63/0227* (2013.01)
USPC .......... 726/11; 726/2; 726/3; 726/12; 726/13; 726/22; 726/23; 726/24; 726/25; 709/201; 709/202; 709/203; 709/223; 709/224; 709/227; 709/246

(58) Field of Classification Search
CPC .................................. H04L 63/0263
USPC ........................................................ 726/11
See application file for complete search history.

(56) References Cited

U.S. PATENT DOCUMENTS

| | | | |
|---|---|---|---|
| 6,772,226 | B1 | 8/2004 | Bommareddy et al. |
| 6,880,089 | B1 | 4/2005 | Bommareddy et al. |
| 7,254,834 | B2 * | 8/2007 | Goddard ........................ 726/11 |
| 7,266,715 | B1 | 9/2007 | Bazzinotti et al. |
| 7,447,901 | B1 | 11/2008 | Sullenberger et al. |
| 7,844,731 | B1 | 11/2010 | Zhou |
| 8,015,298 | B2 * | 9/2011 | Yevmenkin et al. .......... 709/227 |
| 2003/0002494 | A1 | 1/2003 | Kuukankorpi et al. |
| 2003/0018914 | A1 | 1/2003 | Cheng et al. |

(Continued)

FOREIGN PATENT DOCUMENTS

| | | |
|---|---|---|
| WO | 02/15514 A2 | 2/2002 |
| WO | 2013/036646 A1 | 3/2013 |
| WO | 2013/036651 A1 | 3/2013 |
| WO | 2013/089935 A1 | 6/2013 |

OTHER PUBLICATIONS

Cisco, "Cisco ASA 5500 Series Configuration Guide using the CLI", Jan. 31, 2011, pp. 1-1994.*

(Continued)

*Primary Examiner* — Luu Pham
*Assistant Examiner* — Canh Le
(74) *Attorney, Agent, or Firm* — Wong, Cabello, Lutch, Rutherford & Brucculeri, LLP

(57) ABSTRACT

A firewall cluster system comprises a first node operable to receive a connection in a firewall cluster having three or more nodes, determine user data associated with the connection, and share the user data with at least another node in the firewall cluster.

19 Claims, 4 Drawing Sheets

(56) References Cited

U.S. PATENT DOCUMENTS

| | | | |
|---|---|---|---|
| 2005/0240989 | A1 | 10/2005 | Kim et al. |
| 2006/0013227 | A1* | 1/2006 | Kannan .................. 370/392 |
| 2006/0075478 | A1 | 4/2006 | Hyndman |
| 2006/0143699 | A1* | 6/2006 | Nagata et al. ............... 726/11 |
| 2006/0195896 | A1 | 8/2006 | Fulp et al. |
| 2007/0180226 | A1* | 8/2007 | Schory et al. ............. 713/153 |
| 2007/0180513 | A1* | 8/2007 | Raz et al. .................. 726/12 |
| 2007/0294754 | A1 | 12/2007 | Finkelstein et al. |
| 2008/0028456 | A1 | 1/2008 | O'Rourke et al. |
| 2008/0098113 | A1* | 4/2008 | Hansen et al. ............ 709/226 |
| 2008/0115205 | A1 | 5/2008 | Aaron |
| 2009/0113051 | A1 | 4/2009 | Franklin |
| 2010/0177644 | A1* | 7/2010 | Kucharczyk ............. 370/250 |
| 2011/0030049 | A1 | 2/2011 | Adams et al. |
| 2012/0039231 | A1 | 2/2012 | Suri et al. |
| 2012/0057591 | A1* | 3/2012 | Erman et al. ............. 370/389 |
| 2012/0210416 | A1* | 8/2012 | Mihelich et al. ........... 726/11 |
| 2012/0304244 | A1* | 11/2012 | Xie et al. ..................... 726/1 |
| 2013/0014023 | A1* | 1/2013 | Lee et al. .................. 715/751 |
| 2013/0073743 | A1 | 3/2013 | Ramasamy et al. |
| 2013/0152156 | A1 | 6/2013 | Allison et al. |

OTHER PUBLICATIONS

Pete Lindstrom, "Intrusion Prevention System (IPS): Next generation firewalls", Mar. 2004, pp. 1-8.*

Gary Audin, "Next-Gen Firewalls: What to Expect", pp. 1-6.*

International Search Report dated Jan. 25, 2013 regarding application No. PCT/US2012/053976.

International Search Report received for PCT Patent Application No. PCT/US2012/053971, mailed on Jan. 23, 2013, 3 pages.

International Preliminary Report on Patentability and Written Opinion received for PCT Patent Application No. PCT/US2012/053976, mailed on Mar. 20, 2014, 6 pages.

Petri, Daniel, "What are IPSEC Policies"?, Jan. 8, 2009, 7 pages. Web link available at: http://www.petri.co.il/what_are_ipsec_policies.htm.

International Search Report and Written Opinion received for PCT Patent Application No. PCT/US2012/063249, mailed on Dec. 27, 2012, 5 pages.

International Preliminary Report on Patentability and Written Opinion received for PCT Patent Application No. PCT/US2012/063249, mailed on Jun. 26, 2014, 8 pages.

Final Office Action received for U.S. Appl. No. 13/227,825, mailed on May 28, 2013, 17 pages.

Final Office Action received for U.S. Appl. No. 13/323,816, mailed on Jul. 12, 2013, 15 pages.

Non-Final Office Action received for U.S. Appl. No. 13/323,816, mailed on Jan. 31, 2013, 12 pages.

Non-Final Office Action received for U.S. Appl. No. 13/227,825, mailed on Nov. 8, 2012, 13 pages.

Non-Final Office Action received for U.S. Appl. No. 13/227,825, mailed on Sep. 12, 2013, 15 pages.

Notice of Allowance received for U.S. Appl. No. 13/227,825, mailed on Feb. 14, 2014, 8 pages.

* cited by examiner

AUTHENTICATION SHARING IN A FIREWALL CLUSTER

FIELD OF THE INVENTION

The invention relates generally to firewall operation, and more specifically in one embodiment to authentication sharing in a firewall cluster.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall or similar device between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

The firewall typically controls the flow of network information by monitoring connections between various ports, sockets, and protocols, such as by examining the network traffic in a firewall. Rules based on socket, port, application, and other information are used to selectively filter or pass data, and to log network activity. Firewall rules are typically configured to identify certain types of network traffic that are to be prohibited or that should have certain other restrictions applied, such as blocking traffic on ports known to be used for file sharing programs while virus scanning any received traffic over a traditional File Transfer Protocol (FTP) port, blocking certain applications or users from performing some tasks while allowing others to perform such tasks, and blocking traffic based on known attack patterns such as repeated queries to different ports from a common Internet Protocol (IP) address.

But, the ability of a firewall to manage such connections when distributed across multiple computer systems is limited in that knowledge of a connection is typically stored only in the system handling the connection. Improved firewall distribution in a cluster is therefore desired.

SUMMARY

Various example embodiments of the invention comprise a firewall cluster system including a first node operable to receive a connection in a firewall cluster having three or more nodes, determine user data associated with the connection, and share the user data with at least another node in the firewall cluster. Another node can use the application state data to continue processing the connection such as if the first node fails, or to provide load balancing.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
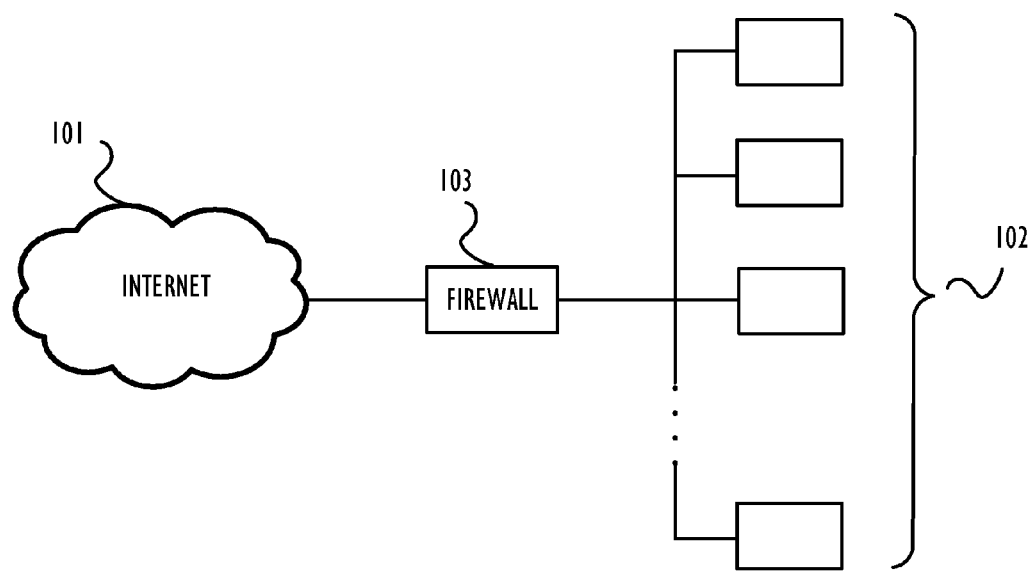
FIG. 1 shows an example network including a firewall, as may be used to practice some embodiments of the invention.

FIG. 1 illustrates a typical computer network environment, including a public network such as the Internet at 101, a private network 102, and a computer network device operable to provide firewall and intrusion protection functions shown at 103. In this particular example, the computer network device 103 is positioned between the Internet and the private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some firewalls also examine packets to determine what application has established the connection, or act as a proxy device by processing and forwarding selected network requests between a protected user and external networked computers. Firewalls often use "signatures" or other characteristics of undesired traffic to detect and block traffic that is deemed harmful or that is otherwise undesired.

Firewalls typically use sets of rules to filter traffic, such that what happens with any particular element of network data is dependent on how the rule set applies to that particular data. For example a rule blocking all traffic to port 6346 will block incoming traffic bound for that port on a server within the protected network, but will not block other data going to the same server on a different port number. Similarly, a rule blocking traffic originating from a file sharing program such as Shareaza will use patterns in the traffic to block Shareaza traffic on port 6346, but allow other traffic on port 6346.

But, in an environment where a firewall is implemented as a system distributed across multiple computers or nodes, such as in a large or complex system, the ability of multiple nodes to share a connection is limited by each node's information regarding the connection, such as socket information, application information, user information, and the like regarding the connection. Some embodiments of the invention therefore provide a mechanism for sharing state information such as user or other such connection data with other systems in a cluster firewall, enabling multiple nodes in the firewall cluster to process the same connection. This provides the cluster the ability to load balance by moving connection responsibility between systems, to manage failure of a node in the cluster by moving its connections to another machine, and to perform other such functions.

Figure 2:
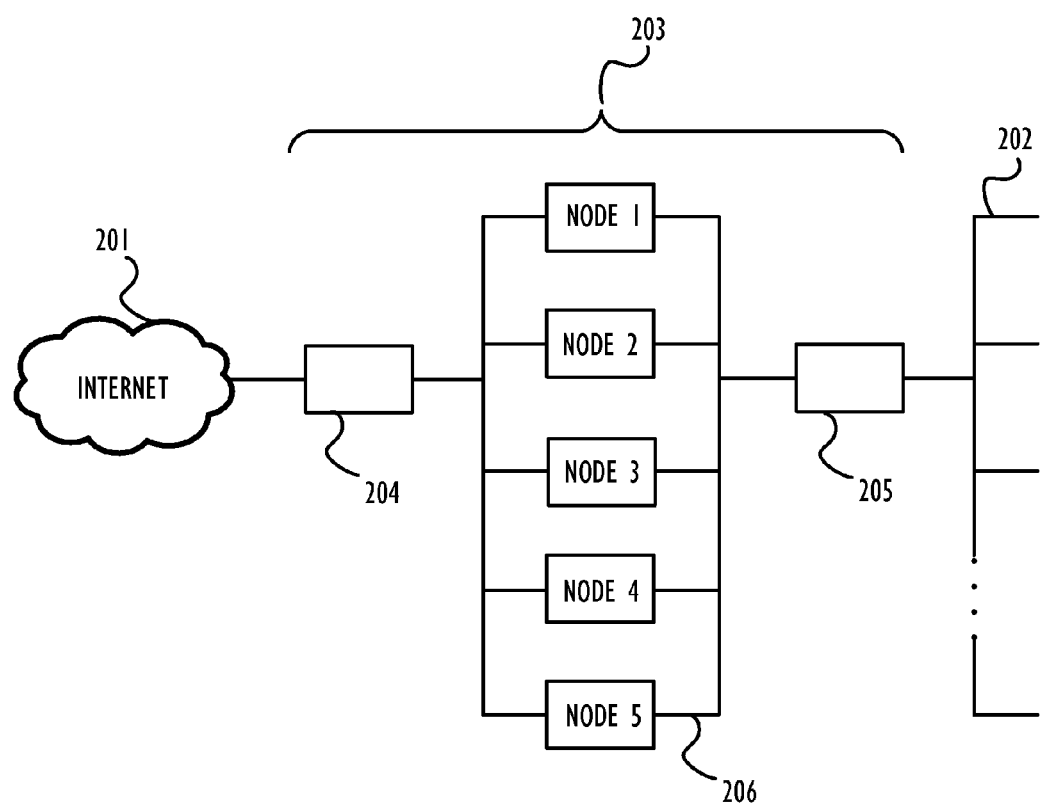
FIG. 2 shows an example network including a firewall cluster comprising multiple firewall nodes, as may be used to practice some embodiments of the invention.

In one such example, a firewall or intrusion protection system is implemented as a cluster or connected group of nodes that share processing traffic flowing through the firewall. FIG. 2 shows a network with a distributed firewall, as may be used to practice some embodiments of the invention. Here, a network such as the Internet 201 is coupled to an internal network 202 by a firewall, 203. The firewall 203 comprises an incoming traffic module 204 and an outgoing traffic module 205 that can perform functions such as load balancing and other firewall management functions. The firewall or intrusion protection rules are applied in firewall nodes 206, which are connected to one another by network connections as shown.

Here the five nodes shown each comprise a separate computer system running an instance of firewall or related software, operable to apply rules to traffic to selectively permit or block traffic flowing between the Internet 201 and the internal network 202. In an alternate embodiment, some nodes such as nodes 1, 2, and 3 execute a firewall application, while other nodes such as 4 and 5 execute an intrusion protection system (IPS) application. The nodes 204 and 205 are responsible for performing functions such as load balancing traffic routed to the firewall nodes 206, ensuring that the nodes are able to work together efficiently to provide higher throughput capability than a single node.

Some firewall embodiments perform complex connection identification functions that go beyond simple application of port, IP, and other such rules to a data stream. For example, some firewall examples include a user "passport", associating a user with a particular connection by using user authentication to the firewall, or using indirect user authentication such as a Microsoft domain server logon or other user credential that can be read by the firewall. This passport associates an identified user with a particular IP address, MAC address, or other identifier so that connections coming from the user can be identified as belonging to the user.

User-based filtering can then be performed in the firewall. For example, a firewall may know that Alice is a member of a management group, while Bob is a member of the employees group but not management. Both users log on to computers and run Skype to join a video conference, and the firewall determines that both users are permitted to use Skype to send videoconference traffic through the firewall, such as to videoconference with outside vendors or customers.

Bob attempts to send a file using Skype, and the firewall applies a rule permitting only members of the managers group to send files outbound using Skype. The firewall uses the passport user and IP address information associated with Bob's connection to determine that Bob is the one attempting to send the file, and therefore blocks Bob's file. Alice then tries to send the same file using Skype, and the passport associated with Alice's connection identifies Alice as the user associated with the connection and permits the file to be sent.

But, if the firewall is distributed across multiple nodes, applying the appropriate rule to the connection becomes more difficult in that while each node has the same firewall rules, only the node managing the connection knows user information such as the user name and IP address (or passport) for the connection. Some embodiments of the invention therefore comprise distributing the user passport information between nodes in a firewall cluster, such as by multicasting the user passport information or sending the user passport information to a master node for distribution.

Figure 3:
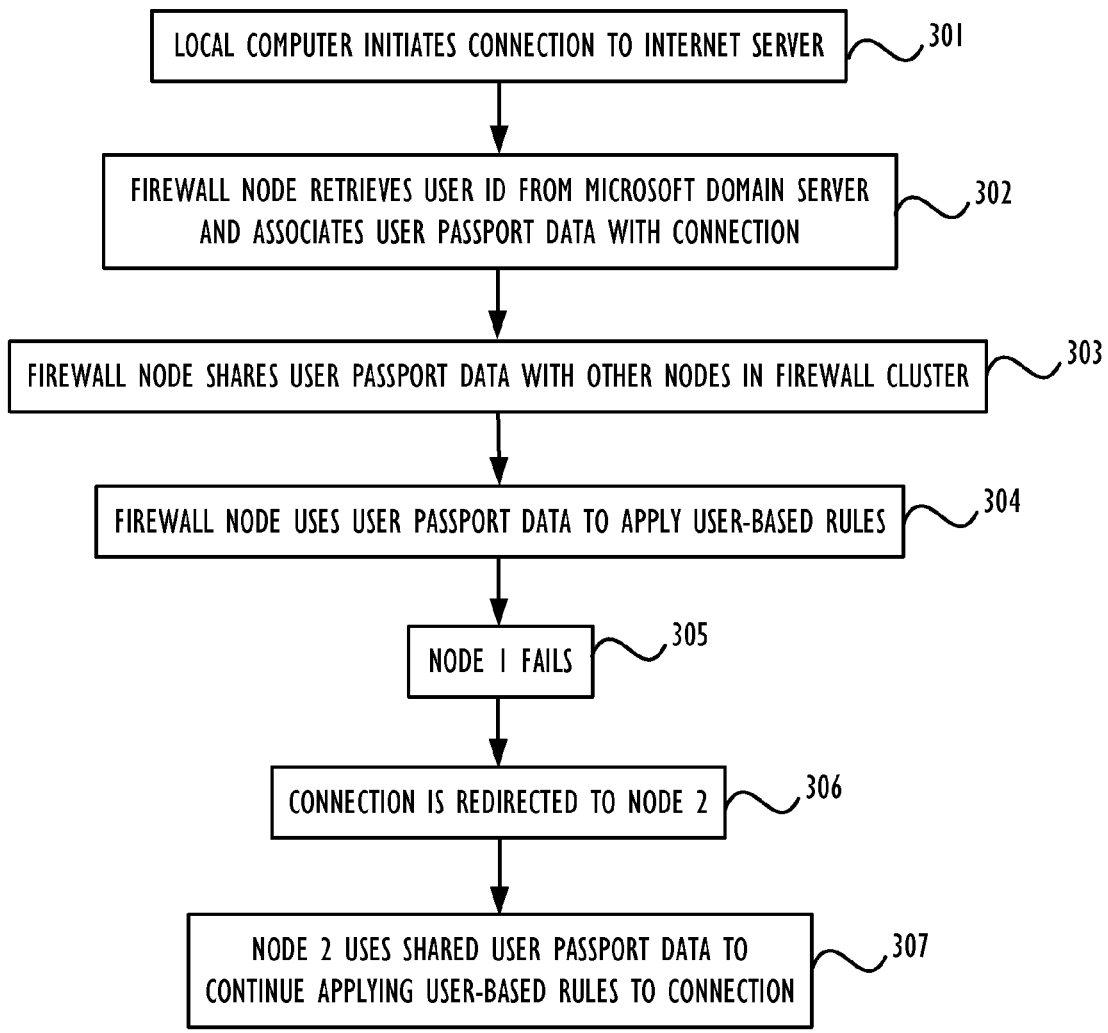
FIG. 3 is a flowchart illustrating use of shared user passport information in a firewall cluster, consistent with an example embodiment of the invention.

FIG. 3 is a flowchart illustrating use of shared user passport information in a firewall cluster, consistent with an example embodiment of the invention. At 301, a link is initiated between a computer in local network 202 and the Internet 201. The link between nodes is handled by node 1, which retrieves user passport information such as from a Microsoft domain server login or the user logging directly into the firewall as soon as the network connection is established at 302. The firewall node 1 then shares this user passport data for the connection with other nodes at 303, and uses the user passport data to apply user-specific rules to the firewall at 304.

At 305, node 1 fails, and the connection is redirected to node 2 at 306.

Because node 2 has received user passport data regarding the connection from node 1 previously, node 2 is able to resume filtering the data stream including applying user-specific rules to the connection at 308.

Figure 4:
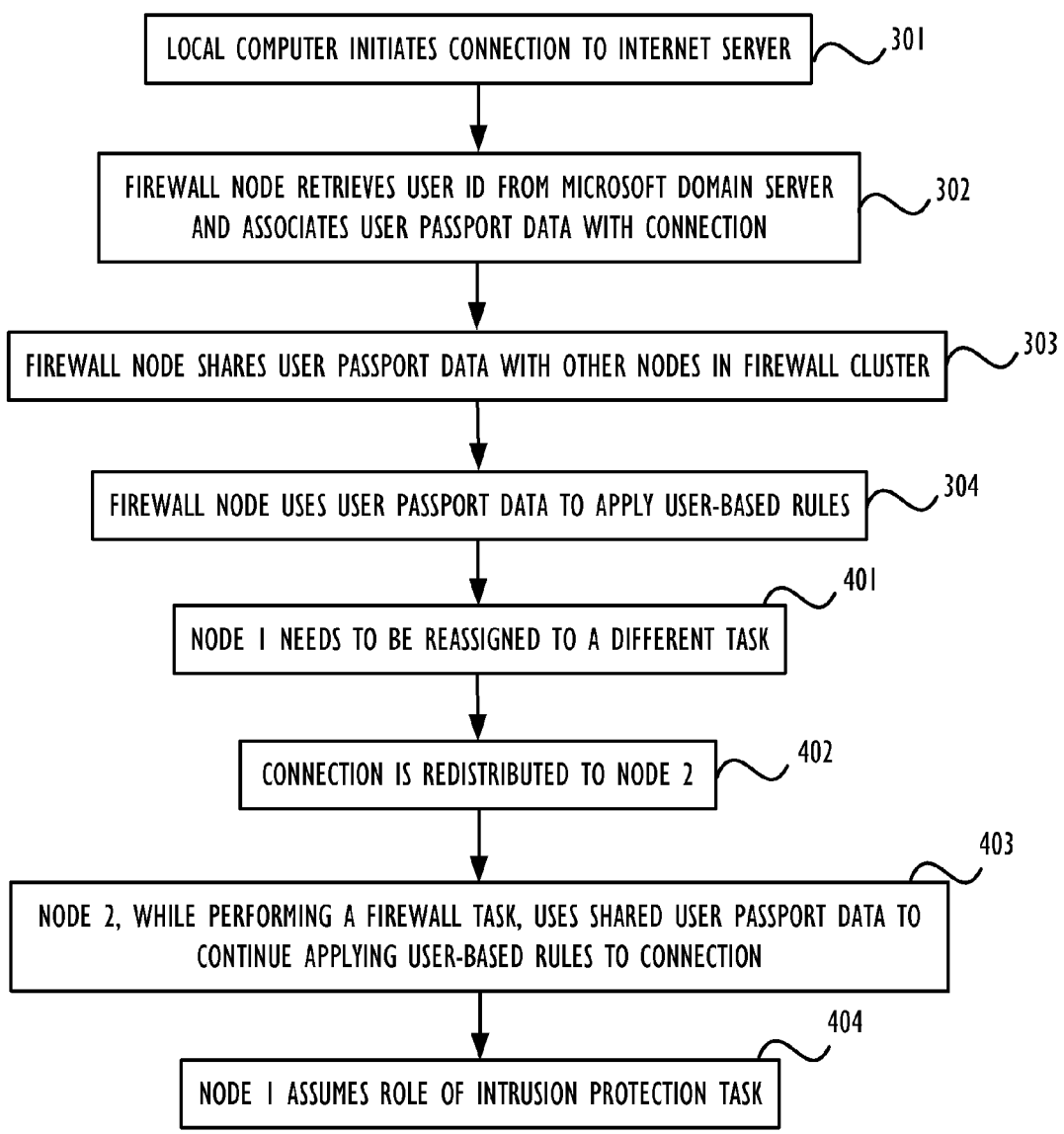
FIG. 4 is a flowchart illustrating reassignment of a node in a firewall cluster according to one embodiment.

Although this example illustrates how a node can resume filtering a connection after another node fails, similar methods can be employed to move connections from one node to another node in a distributed firewall cluster for applications such as load balancing, or reassignment of nodes to different tasks (FIG. 4 illustrates a reassignment example using common reference numbers with FIG. 3 where applicable).

In one such example of reassignment, firewall node 1 does not fail, but an intrusion protection system node that is one of two such intrusion protection nodes (not pictured) fails. The system desires to maintain a certain balance between the number of nodes providing firewall service and the number of nodes providing intrusion protection, and in this example the intrusion protection system has lost half of its capacity when one of its two nodes failed. The system therefore reassigns (401) firewall node 1 to replace the failed intrusion protection node, resulting in connections previously being handled by firewall node one being redistributed (402) to node 2 or possibly across firewall nodes 2-5, as shown in FIG. 2. Similar to block 307, at block 403, node 2 uses the shared data to take over the firewall task for the connection, thus allowing (404) node 1 to assume the role of intrusion protection in this example.

These examples illustrate how sharing user passport data in a firewall cluster can facilitate load balancing, failover, and other functions within the firewall cluster, making user-based filtering of network traffic in a firewall cluster more manageable and reliable.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of operating a firewall cluster, comprising:
receiving a connection request in a first node of a firewall cluster having three or more nodes, the first node performing a firewall task;
processing the connection request to establish a connection;
determining user data associated with the established connection;
sharing the user data with at least another node in the firewall cluster; and
reassigning the first node, comprising:
changing the first node from performing the firewall task to performing an intrusion protection task;
redirecting the established connection from the first node to the at least another node; and
reassigning the first node to perform the intrusion protection task,
wherein reassigning the first node is in response to failure of a second node configured to perform the intrusion protection task.

2. The method of operating a firewall cluster of claim 1, further comprising sharing connection information regarding the received connection request with the at least another node in the firewall cluster after receiving the connection request but before sharing the user data.

3. The method of operating a firewall cluster of claim 1, wherein the user data comprises identity of a user and an IP address each associated with the connection request.

4. The method of operating a firewall cluster of claim 1, wherein sharing user data comprises broadcasting the user data to a plurality of other nodes in the firewall cluster.

5. The method of operating a firewall cluster of claim 1, wherein sharing user data comprises sending the user data to a master node.

6. The method of operating a firewall cluster of claim 5, further comprising the master node broadcasting the user data to other nodes in the firewall cluster.

7. The method of operating a firewall cluster of claim 1, further comprising using the shared user data associated with the established connection to filter a corresponding subsequently established connection in another node upon failure of the first node.

8. The method of operating a firewall cluster of claim 1, further comprising using the shared user data associated with the established connection to filter a corresponding subsequently established connection in another node to provide load balancing in the firewall cluster.

9. A firewall cluster, comprising:
a first node and a second node of three or more total nodes, wherein the first node is configured to:
receive a connection request while the first node is performing a firewall task;
process the connection request to establish a first connection;
determine user data associated with the first connection;
share the user data with at least the second node in the firewall cluster;
receive an instruction to stop performing the firewall task;
stop performing the firewall task for the first connection; and
start performing an intrusion protection task; and
the second node configured to:
establish a subsequent connection corresponding to the first connection; and
perform the firewall task for the subsequent connection utilizing the shared user data,
wherein the instruction is received in response to failure of a third node configured to perform the intrusion protection task.

10. The firewall cluster of claim 9, the first node further configured to share connection information regarding the received connection request with the second node in the firewall cluster after receiving the connection request but before sharing user data.

11. The firewall cluster of claim 9, wherein user data comprises an identity of a user and an IP address each associated with the connection request.

12. The firewall cluster of claim 9, wherein sharing user data comprises broadcasting the user data to other nodes in the firewall cluster.

13. The firewall cluster of claim 9, further comprising a master node, and wherein sharing user data comprises sending the user data to the master node.

14. The firewall cluster of claim 13, the master node further configured to broadcast the user data to other nodes in the firewall cluster.

15. The firewall cluster of claim 9, the second node configured to use the shared user data associated with the first connection to filter the subsequent connection upon failure of the first node.

16. The firewall cluster of claim 9, the second node configured to use the shared user data associated with the first connection to filter the subsequent connection to provide load balancing in the firewall cluster.

17. The method of claim 1, wherein determining user data is performed while processing the connection request prior to forming the established connection.

18. The firewall cluster of claim 9, wherein determining user data is performed while the first node is processing the connection request and prior to forming the first connection.

19. One or more non-transitory program storage devices comprising instructions stored thereon, the instructions when executed by one or more processors cause the one or more processors to:
- receive a connection request in a first node of a firewall cluster having three or more nodes, the first node performing a firewall task;
- process the connection request to establish a connection;
- determine user data associated with the established connection;
- share the user data with at least another node in the firewall cluster;
- determine to reassign the first node, wherein reassigning comprises changing the first node from performing the firewall task to performing an intrusion protection task;
- redirect the established connection from the first node to the at least another node; and
- reassign the first node to perform the intrusion protection task,
- wherein reassignment of the first node is performed in response to failure of a second node configured to perform the intrusion protection task.

* * * * *